April 19, 1932.   J. NIELSEN   1,854,620
DIRECTION SIGNALING DEVICE
Original Filed Feb. 27, 1929    2 Sheets-Sheet 1

Jack Nielsen INVENTOR
BY Victor J. Evans
ATTORNEY

April 19, 1932.  J. NIELSEN  1,854,620
DIRECTION SIGNALING DEVICE
Original Filed Feb. 27, 1929   2 Sheets-Sheet 2
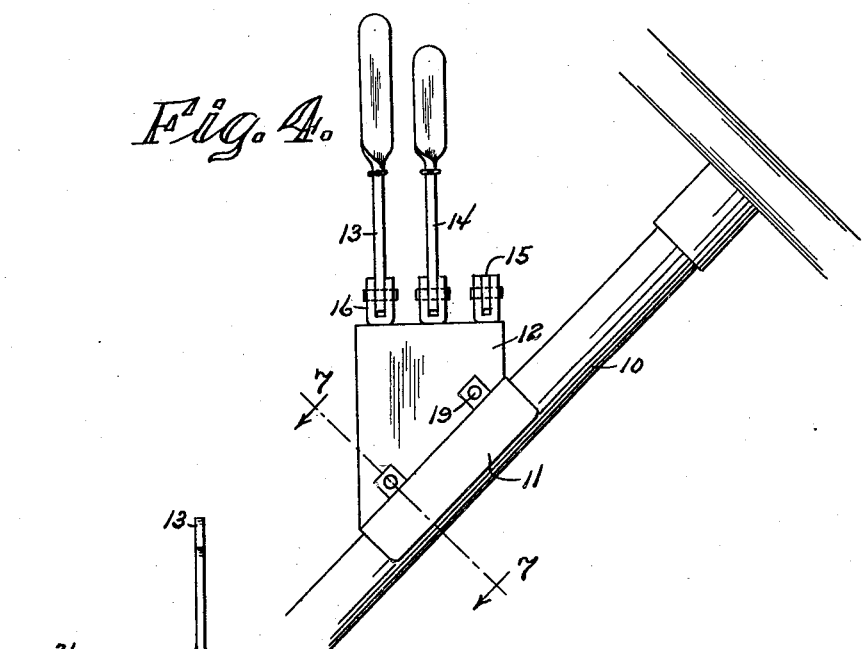
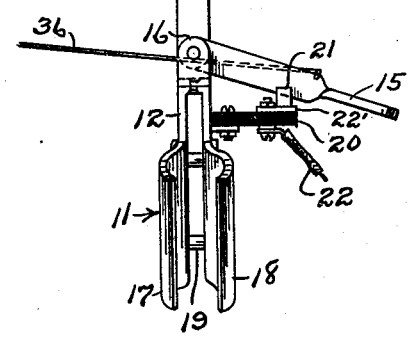
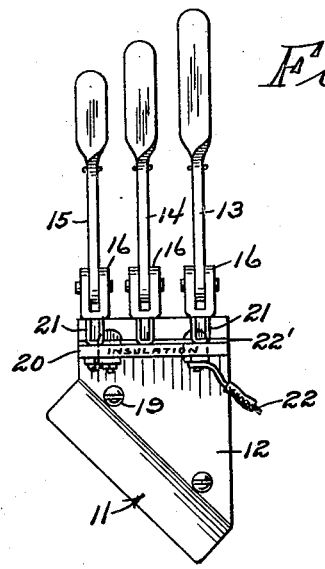
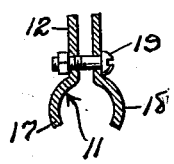
Jack Nielsen
INVENTOR
BY Victor J. Evans
ATTORNEY Patented Apr. 19, 1932

1,854,620

UNITED STATES PATENT OFFICE

JACK NIELSEN, OF ST. PAUL, NEBRASKA

DIRECTION SIGNALING DEVICE

Application filed February 27, 1929, Serial No. 343,132. Renewed August 24, 1931.

The object of this invention is to provide means for indicating the direction of travel of a motor vehicle, said means comprising a plurality of pivotally mounted arms connected and controlled in the special manner disclosed below.

A further object is to provide a lever mounting device to be carried by the steering pillar and having formed therewith or carried thereby certain contact elements through which the electrical portion of the apparatus may be energized.

With the foregoing and other objects in view, the invention consists in the novel construction and arrangement of elements described and claimed, it being understood that modifications may be made within the scope of the claims without departing from the spirit of the invention.

In the drawings forming part of this application,

Figure 4 is in elevation, and shows the lever mounting means on the steering column;

Figure 5 is a detail view showing the connections for one of the levers and the clamp for the steering column;

Figure 6 is in elevation showing part of the structure of Figure 4, from the other side;

Figure 7 is a detail view constituting a section on line 7—7 of Figure 4.

Figure 1:
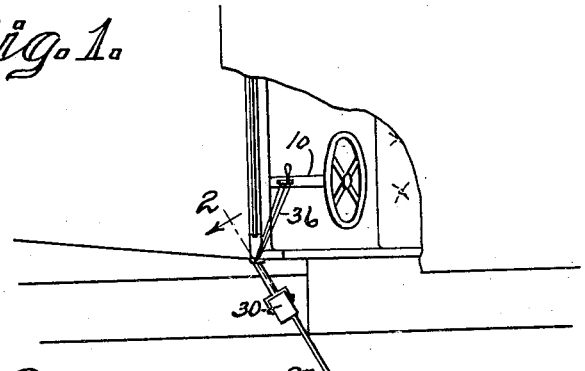
Figure 1 shows the manner of connecting the device with the steering pillar, and the relative position of the signaling means.
Figure 2:
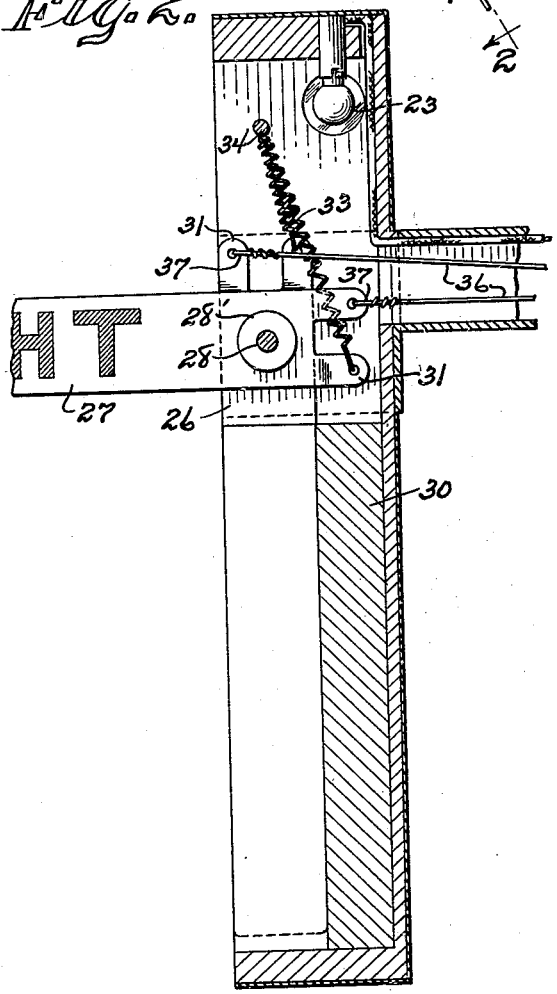
Figure 2 is a vertical section on line 2—2 of Fig. 1, through the housing in which the signal arms are mounted.

The steering column or pillar 10 is designed to have secured thereto a clamp 11 carried by box or housing 12 which supports the operating levers 13, 14, 15 each pivoted between ears such as 16, and adapted to be swung by the driver or operator, to position for raising the signal arms.

Housing 12 mounts or has formed therewith an element 17 of a clamp, and this, with opposite member 18, secures the device to the pillar 10, when screw or screws 19 are tightened.

A laterally extending member of insulation is designated 20 and mounts spring contact clips 21, for wires such as 22, through which the lamp 23 may be energized, it being assumed that suitable circuits will be provided. One wire 22 is sufficient if the contacts are connected by a strip 22'.

Arms or levers 13, 14, 15 engage their respective contacts 21, shown in Figure 6, when said arms or levers are swung by the operator, for that purpose, and the lamp will be energized when any signal arm moves to operative position.

The signal arms 25, 26, 27 are pivotally mounted by a bolt or the like 28 passing through the housing 30, and each arm carries a pair of ears or tongues such as 31, spaced and apertured as shown, and intended respectively for engagement by a spring such as 33, secured at 34 and effecting return to normal position, and for engagement by an operating wire 36 connected as at 37 with each lever 13, 14 or 15. This provides for lifting to approximately horizontal position that signal arm indicating the intention of the driver with reference to a right or left hand turn or a full stop. The release of any operating arm (constituting a switch arm for the lamp circuit, not shown in full), permits the signal arm to return to normal position under the action of its spring, and simultaneously breaks the lamp circuit. From the disclosure in Figure 5, it will be observed that the switch contacts are positioned for engagement by the arms, respectively, upon swinging movement of the latter to a point where the tension on each flexible device is on that side of the axis (defined by the swinging movement) tending to prevent accidental displacement of the operating arm.

Figure 3:
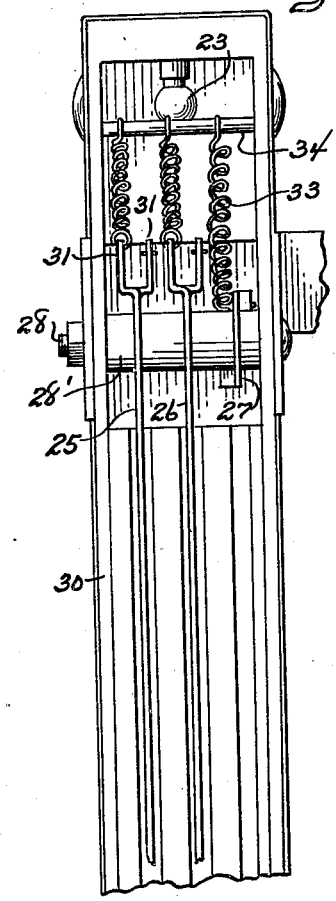
Figure 3 is a view in elevation, looking from the left in Figure 1.

The springs 33 and controlling wires 36 are effectively prevented from interfering one with another by reason of the offset or deflected arms or tongues 31—the ears of each pair being deflected in opposite directions, as in Figure 3. The signal arms are themselves spaced by washers 28' on bolt 28, and it is the intention that each operating lever 13, 14 or 15 shall carry a designation corresponding with the signal arm controlled thereby.

What I claim is—

1. In a direction signal, a pivotally mounted arm including longitudinally extending ears turned in opposite directions, resilient means connected with one of the ears, a flexible device connected with the other ear, a pivoted operating arm with which the flexible device is connected, and means frictionally engaged by the operating arm and adapted to retain the latter until shifted.

2. In a direction signal, a plurality of pivoted signal arms, means for spacing the arms, a pair of longitudinally spaced and deflected ears carried by one end of each arm, the ears of individual arms being reversely positioned with reference to each other and with reference to the planes of movement of the respective arms, a spring connected with one ear of each pair, a flexible device connected with the other ear, a plurality of pivoted operating arms, means for mounting these arms on a steering column, each operating arm having connection with a flexible device and the signal arm controlled thereby, and devices frictionally engaged by the operating arms and positioned for engagement by the arms respectively upon swinging movement of the latter to a point where the tension on each flexible device is on that side of the axis, defined by the swinging movement, which tends to prevent accidental displacement of the operating arm.

In testimony whereof I affix my signature.

JACK NIELSEN.